United States Patent
Crawford et al.

(10) Patent No.: US 7,057,628 B2
(45) Date of Patent: Jun. 6, 2006

(54) METHOD FOR LOCATING WHITE SPACE TO SUPPORT THE AUTOMATED CREATION OF COMPUTER-BASED DRAWINGS THAT ARE VIRTUALLY FREE OF GRAPHICS AND TEXT OVERWRITES

(76) Inventors: Anthony Bruce Crawford, 230 W. Lake Cir., Madison, AL (US) 35758; Edward Francis Boyle, 5059 Sterling Grove La., San Diego, CA (US) 92130

( * ) Notice: Subject to any disclaimer, the term of this patent is extended or adjusted under 35 U.S.C. 154(b) by 0 days.

(21) Appl. No.: 10/685,944

(22) Filed: Oct. 15, 2003

(65) Prior Publication Data
US 2005/0083330 A1    Apr. 21, 2005

(51) Int. Cl.
*G09G 5/00* (2006.01)
(52) U.S. Cl. ..................................................... 345/636
(58) Field of Classification Search ............... 345/619, 345/621, 622, 625, 629–633, 636; 715/518, 715/519; 382/173–180
See application file for complete search history.

(56) References Cited

U.S. PATENT DOCUMENTS

| 5,500,924 | A | * | 3/1996 | deSilva et al. ............... 345/443 |
| 5,638,498 | A | * | 6/1997 | Tyler et al. ................. 358/1.18 |
| 5,953,735 | A | * | 9/1999 | Forcier ........................ 715/541 |
| 5,991,515 | A | * | 11/1999 | Fall et al. ................... 358/1.15 |
| 6,542,635 | B1 | * | 4/2003 | Hu et al. ..................... 382/173 |
| 2003/0214539 | A1 | * | 11/2003 | Iwema et al. ................ 345/861 |
| 2004/0205623 | A1 | * | 10/2004 | Weil et al. .................. 715/525 |
| 2004/0240735 | A1 | * | 12/2004 | Medina ....................... 382/173 |

\* cited by examiner

*Primary Examiner*—Ryan Yang

(57) ABSTRACT

The invention provides a method to automatically create high quality computer-based drawings by virtually eliminating text and graphics overwrites. This has broad practical application to a class of problems where drawings are created or updated from a non-graphic database. This is achieved through the representation of graphics as a set of bitmap images. As graphic elements are placed onto a drawing plane they contribute to the composition of a drawing's 'committed' bitmap. The proposed addition of new graphic elements onto the drawing plane is represented by a second 'tentative' bitmap. The white space algorithm uses efficient logical AND and logical OR bit manipulations to track and compare these bitmap images and determine if white space is available for placement of the proposed new graphic elements. When acceptable space is located the proposed graphics are simultaneously added to the drawing plane and inserted into the drawing's 'committed' bitmap. The pixels in the 'committed' bitmap are turned ON and becomes more densely populated as additional graphics are placed. This process is repeated until all graphics elements have been added and the drawing is complete.

16 Claims, 6 Drawing Sheets

Line Skip Over Feature

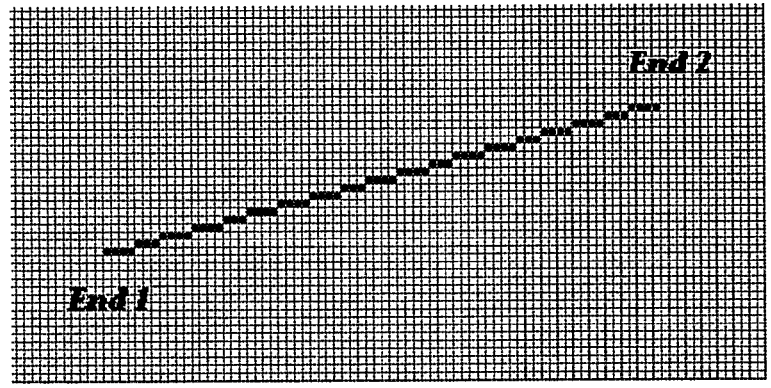
Fig. 1 – Bresenham Algorithm for Stroking a Line
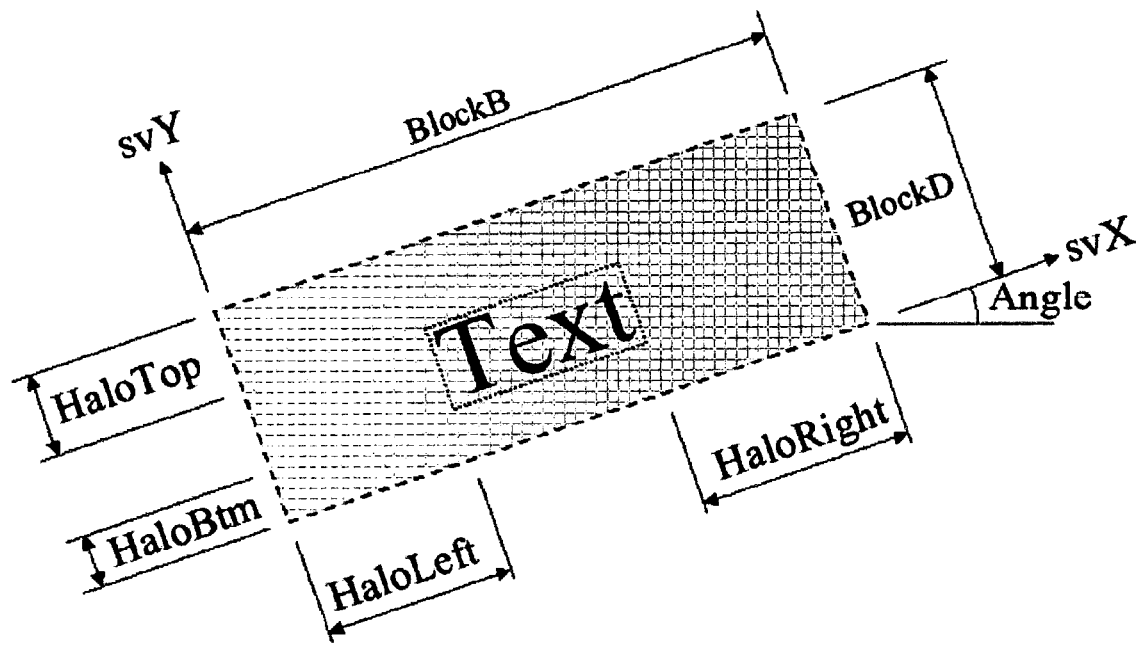
Fig. 2 - Text Element with Halos

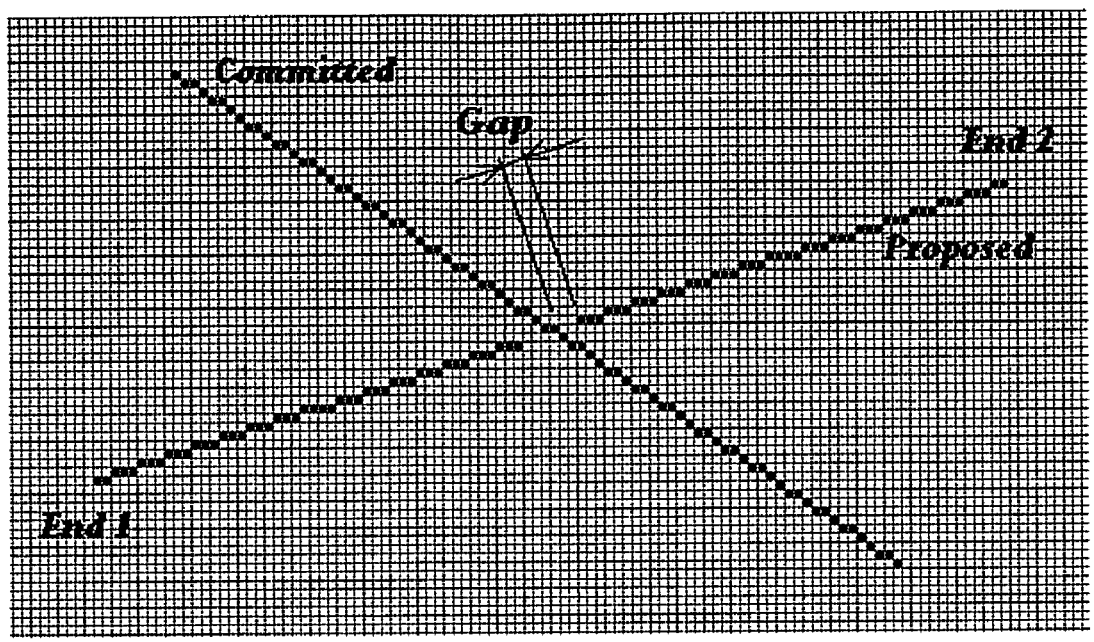
Fig. 3 – Line Skip Over Feature
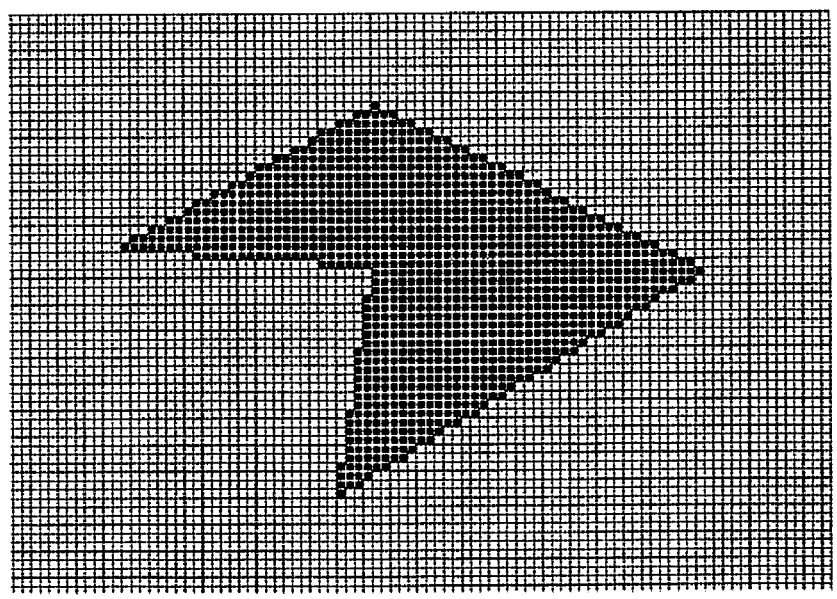
Fig. 4 – Pixel Representation of Polygon Shape

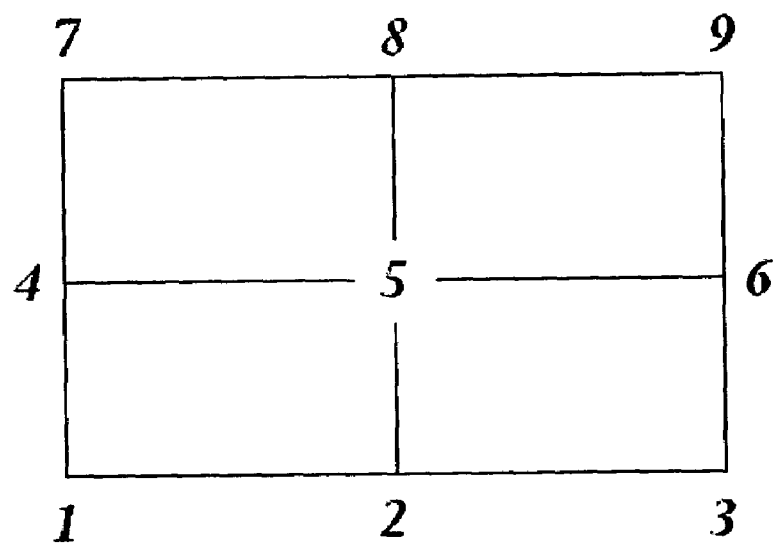
Fig. 5 – Cardinal Points for Text Placement
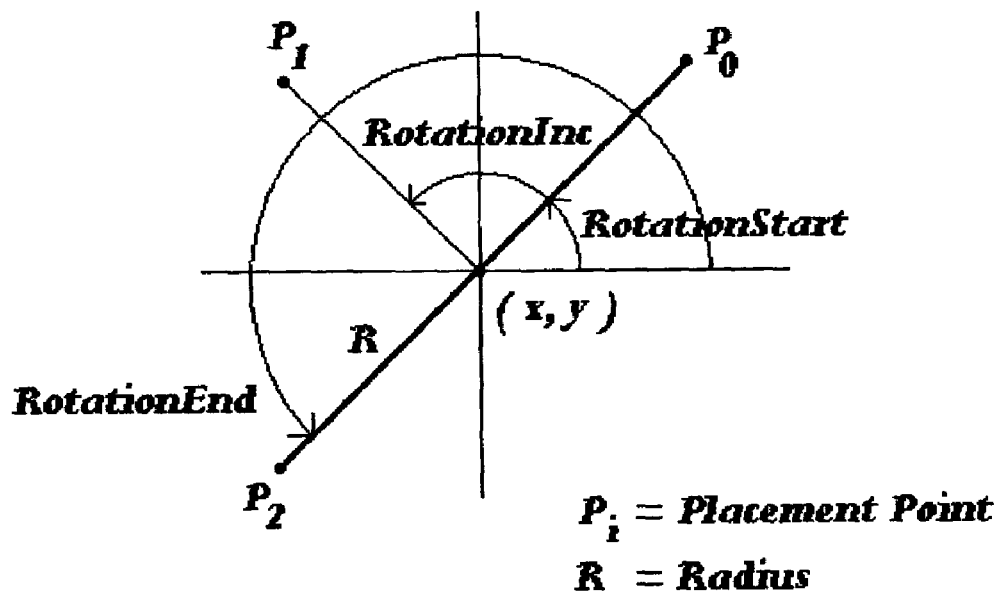
$P_i$ = Placement Point
$R$ = Radius
Fig. 6 – Adjusting the Placement Point by Rotation

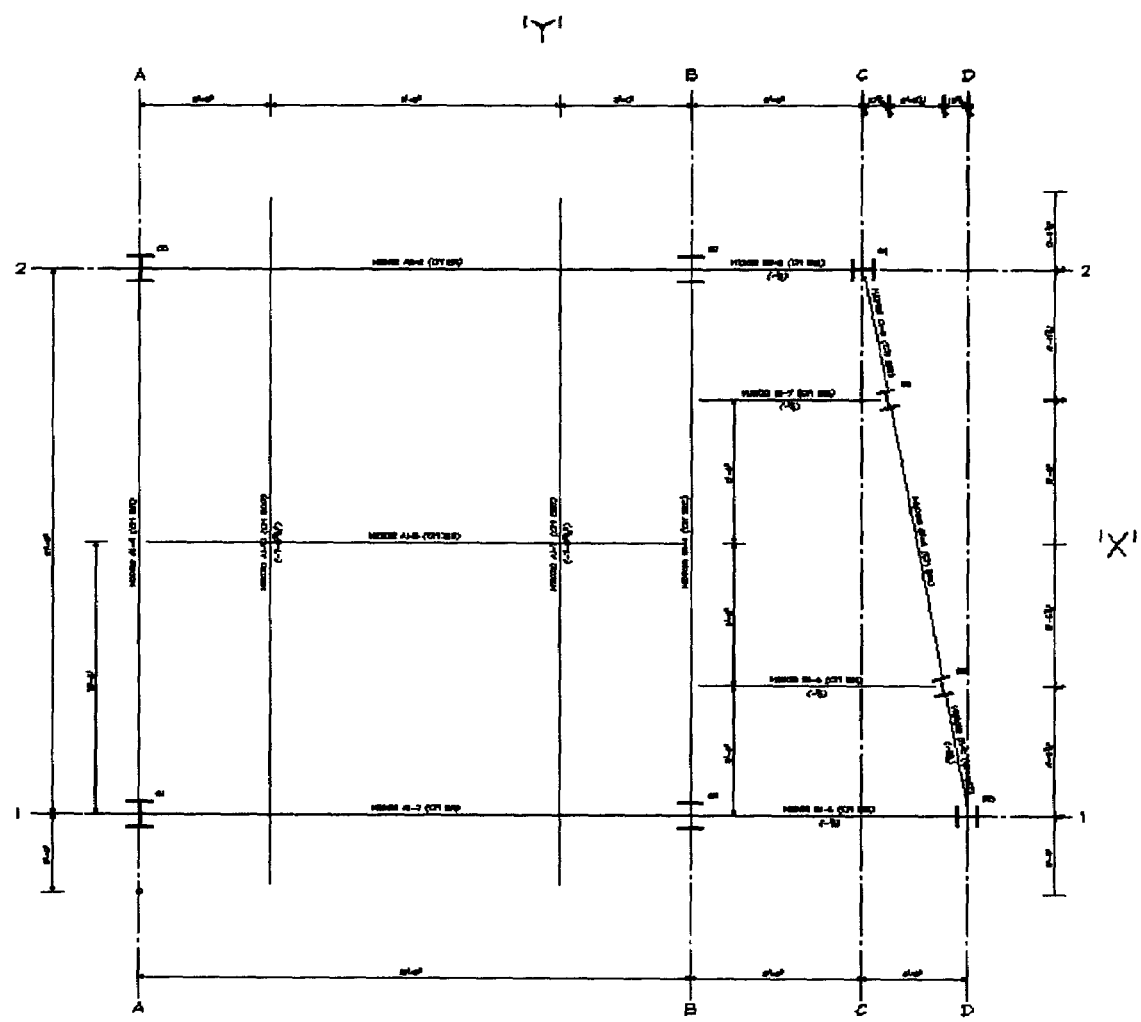
Fig. 7 – Example General Arrangement Drawing - White Space Tracking OFF

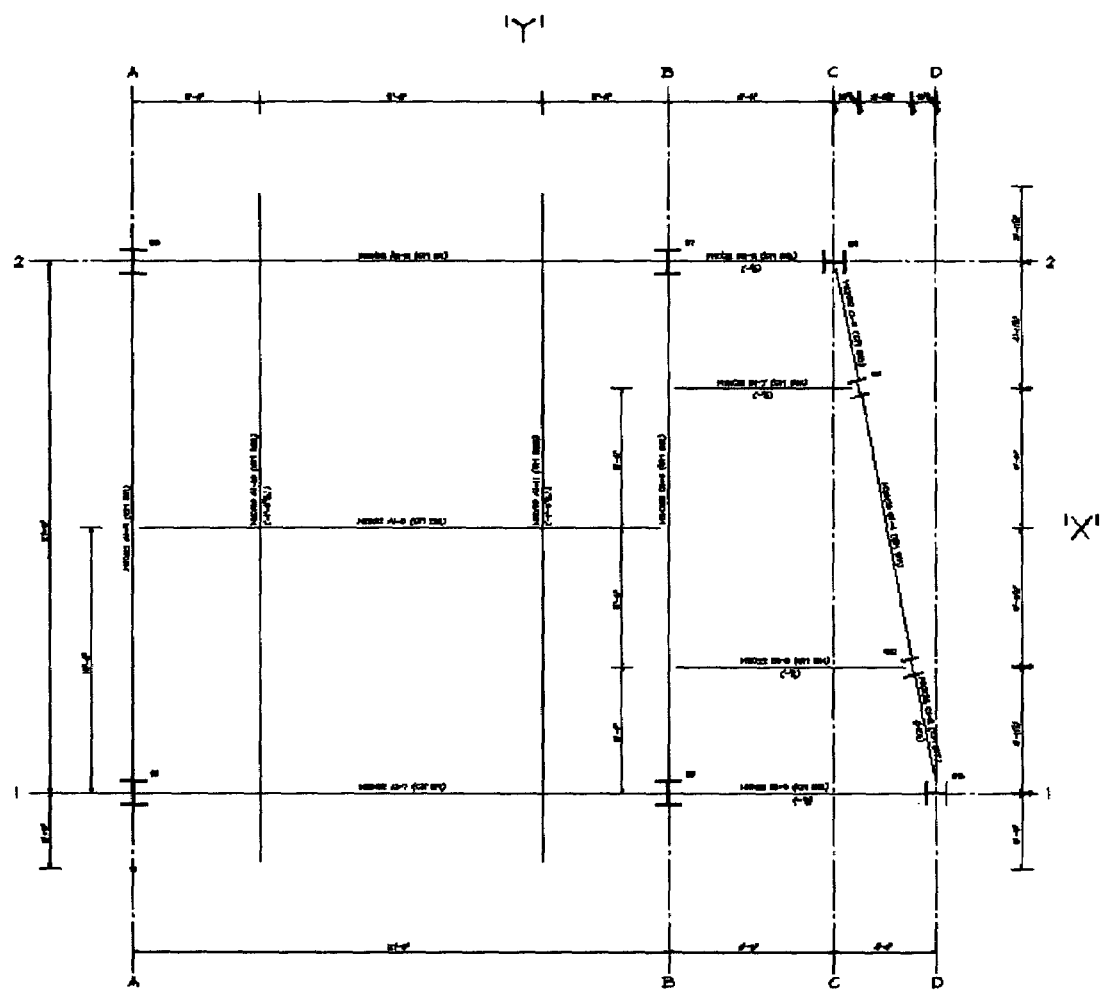
Fig. 8 – Example General Arrangement Drawing – White Space Tracking ON

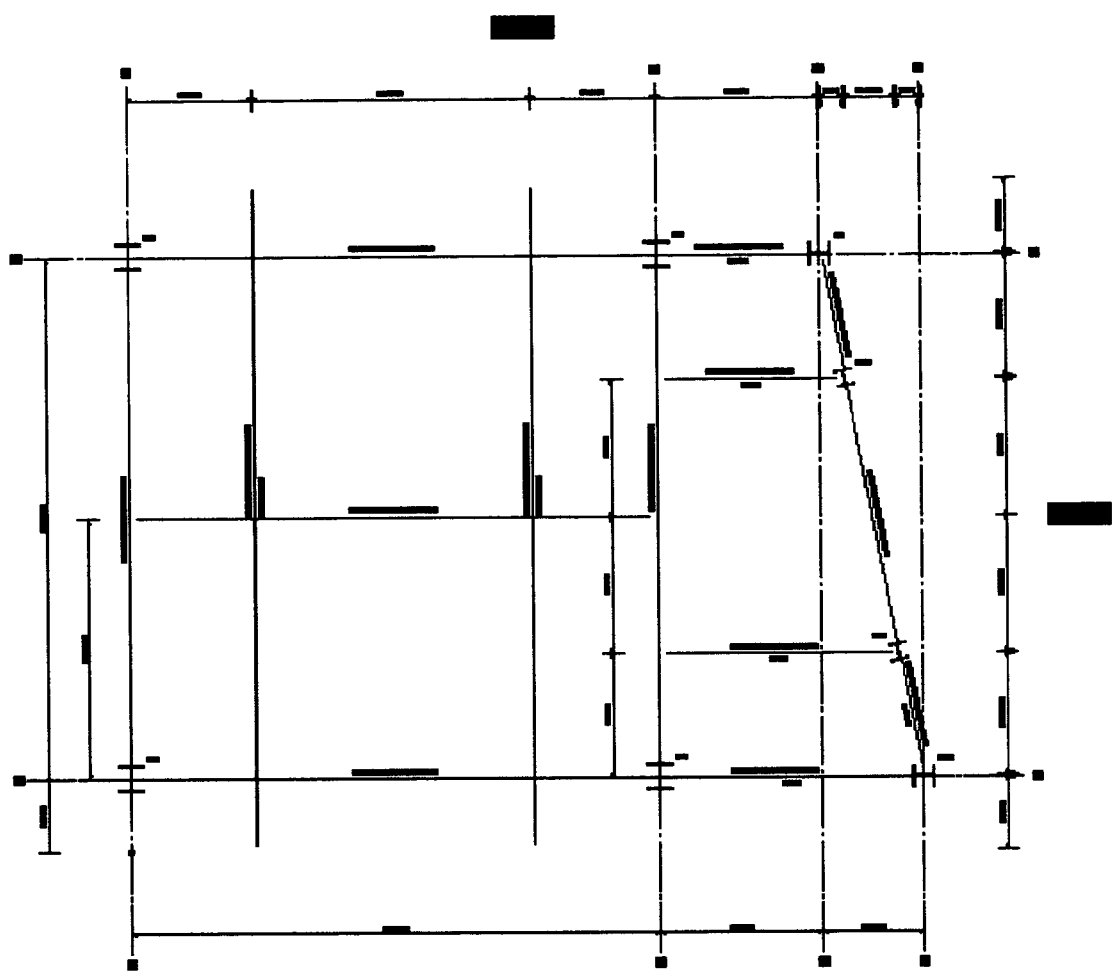
Fig. 9 – Example Bitmap representation of a 'committed' drawing

METHOD FOR LOCATING WHITE SPACE TO SUPPORT THE AUTOMATED CREATION OF COMPUTER-BASED DRAWINGS THAT ARE VIRTUALLY FREE OF GRAPHICS AND TEXT OVERWRITES

BACKGROUND OF THE INVENTION

The problem of finding white space for the placement of graphics and text has long been acknowledged in the Computer Aided Design (CAD) industry. This is clearly evident when creating dense cartographic maps consisting of lines, curves, symbols and text. The method for locating white space provides capabilities for use by end-user applications to determine the quality of space available for adding graphics and text into a drawing view or onto a drawing plane.

This method is applicable to any 3D and 2D computer based application that creates 2D drawing representations. The technology augments, and adds significant value to, solutions that cover generic CAD graphics and a broad range of applications including, but not limited to, structural engineering, civil engineering, transportation engineering, electrical engineering, plant design, architecture, facility management, mapping, utility management, emergency dispatch management and air traffic control displays.

This method can also solve the difficult problem associated with scale changes on computer generated cartographic maps where annotation text must be adjusted manually after each change of scale. A further area of application is annotation of 2-D drawings that are extracted from 3-D CAD models where text and dimensioning typically needs to be adjusted manually to eliminate overwrites. Moreover, as drawings are often extracted multiple times as a result of model revisions, this manual process must be repeated to maintain consistency and drawing quality. Essentially, any diagramming application is able to benefit from this invention.

As part of a comprehensive structural engineering software application, the inventors have successfully applied the method to automatically generate high quality computer-based drawings for steel fabrication layouts and details.

BRIEF SUMMARY OF THE INVENTION

The method is an invention that provides the means for client applications to create drawings that are free from overwritten graphics and text elements. The solution is based on the creation, tracking and comparison of a series of bitmap images that represent 'committed ' and 'proposed' drawing plane graphics. These bitmaps are derived from a transformation of the vector graphics and text into the drawing plane and subsequent mapping into an equivalent pixel representation.

To begin White Space tracking and subsequent location of available space, a client application sets the value of control variables to guide the algorithm. Efficient bit level manipulations are then employed to compare bitmap pairs and return the quality of space via status variables. Adjustment schemes based on a concept of slide vectors are used to reposition proposed graphics into locations of white space.

BRIEF DESCRIPTION OF THE DRAWINGS

The following drawings are part of the specification and these show features and concepts used by the White Space Algorithm:

FIG. 1 shows the pixel representation of a line after vector to pixel transformation using the standard Bresenham line drawing algorithm.

FIG. 2 shows the range of a text element and the definition of halos, slide vectors and text angle.

FIG. 3 shows the line skip over feature used to avoid dense areas of graphics.

FIG. 4 shows a pixel representation of a filled polygon after transforming the perimeter vectors with the Bresenham algorithm and applying a solid fill to the interior.

FIG. 5 shows the notion of cardinal points for text placement.

FIG. 6 shows how a placement point is adjusted through a rotation angle

FIG. 7 is an example of a General Arrangement Drawing that was created with the White Space Algorithm disabled.

FIG. 8 is an example of a General Arrangement Drawing that was created with the automatic White Space Algorithm enabled.

FIG. 9 shows the bitmap representation of a committed drawing.

DETAILED DESCRIPTION OF THE INVENTION

The invention provides support for the creation of computer-based drawings that are virtually free from overwritten graphics and text. At the most fundamental level, this is achieved through the representation of graphics as a pair of bitmap images. As graphic elements are placed onto a drawing plane they contribute to the composition of a drawing's 'committed' bitmap and this is stored in an array of long words (32-bits or pixels per long word). The proposed placement of additional graphics is represented by a second local 'tentative' bitmap. The tentative bitmap is created only within the range of applicable long words needed. The white space algorithm uses efficient logical AND and logical OR bit manipulations to track and compare these bitmap images and determine if white space is available for placement of the proposed additional graphics. When acceptable white space is located the proposed graphics are simultaneously added to the drawing plane and inserted into the drawing's 'committed' bitmap. The pixels on the 'committed' bitmap are turned on and this becomes more densely populated as additional graphics are placed. This process is repeated until all graphics elements have been added and the drawing is complete.

The bitmaps are integer representations of real world 3D coordinates that are transformed into 2D drawing space and mapped into pixel sets. Each bit or pixel state, either a value of 1 for ON or a value of 0 for OFF, is created by stroking vectors and mapping them into an equivalent pixel space by applying the standard Bresenham line drawing algorithm. The resulting bitmaps are stored as arrays of 32-bit words and for a drawing plane of 1024 mm×1024 mm a resolution of 1 mm is achieved with a modest 128 kilobytes (32 k Long Words) of memory. This resolution is considered optimal for the class of drawings created by the inventors and can be increased or decreased as required. Increasing the resolution to 0.5 mm requires 4 times the memory while decreasing the resolution to 2 mm requires only ¼ of the memory. In general, the accuracy can easily be enhanced by a factor of n with a corresponding increase in memory of $n^2$. Additionally, if the client application is creating smaller drawings such as US 8½×11, or European A4, the memory required can be reduced in proportion to the drawing area.

A similar approach is adopted for text elements but the vector stroking is extended to apply a series of parallel vectors that run from the base of the text to the top of the text with each vector being equal to the length of the text string. A dimension line is addressed as a composite element and is the product of lines and text elements. When dimension lines are committed to the drawing plane the entire composite element is mapped into pixel space. However, due to the nature of dimensioning, the arrowheads for the proposed graphics are omitted from the tentative bitmap. This is done to avoid adjacent tentative dimensions lines reporting unwarranted graphical clashes with committed dimensions. Another feature particularly useful for graphics such as dimension leader lines and setting out lines is the ability to automatically break lines as they pass over dense areas in the drawing. This has the same affect as the traditional pen up action and it effectively inhibits drawing over an area of committed graphics elements. This feature is enabled by setting the LineSkipOver control variable to TRUE and the type of result achieved is shown in FIG. 3.

The solution is bit or pixel-based and therefore an integer approximation of the actual drawing space. This is easily handled by applying tolerances and is achieved by specifying a default halo around elements. This has the effect of increasing the range of a proposed element thus ensuring that false white space is avoided. An extension of this halo option enables graphics proximity to be controlled by a client application. Four halo variables are provided at the Top, Bottom, Left and Right. These effectively increase the range of a proposed graphics element, defined by BlockB and BlockD, for which white space is being sought on the drawing plane. These variables are shown for a text element in FIG. 2.

In dense drawing areas it may be inevitable that some degree of overwriting is unavoidable, not only for an automatic computer-based process but also to the trained eye of a qualified human draftsman. Because of this, the method supports the notion of fizzy logic to allow for less than perfect best-case solutions to be accepted. The algorithm provides status variables that define the quality of white space found and these are used by client applications to adjust preferred coordinates before committing to a drawing plane. In this manner overwriting is minimized and the need for subsequent manual clean up of automated graphics can be reduced or even avoided.

The use of sets of bitmaps to represent different aspects of graphics placements allows for flexible placement options. This includes the notion of a 'must hit' bitmap that can be defined as a filled polygon area that specifies a region of the drawing for placement of proposed graphics. The 'must hit' bitmap is used to ensure maximum overlap for the proposed graphics. This is achieved by inverting the objective when applying the bit level comparisons to the applicable pair of bitmaps. An example of where this could be used is the annotation of cartographic maps where text is required to represent a State Park and where this must be located within the park perimeter.

The following tables show the variables used by the method and client applications. Table 1 shows the control variables, Table 2 shows the status variables and Table 3 shows the adjustment scheme options.

TABLE 1

Control Variables

| Control Variable | Type | Description |
| --- | --- | --- |
| TrackWhiteSpace | Boolean | When set to TRUE by a client application this enables White Space Tracking |
| CheckWhiteSpace | Boolean | When set to TRUE by a client application this allows placement of tentative graphics and invokes checking for White Space |
| LineSkipOver | Boolean | When set to TRUE by a client application the white space algorithm places a line that skips over committed graphics without drawing. This is equivalent to a traditional pen up action. |
| SkipGap | Double | This defines the gap to be applied for lines are placed with skip over enabled. |
| HaloTop | Double | This is set by a client application to define the active halo above text elements. The default value is 0.5 mm. |
| HaloBtm | Double | This is set by a client application to define the active halo below text elements. The default value is 0.5 mm. |
| HaloLeft | Double | This is set by a client application to define the active halo to the left of text elements. The default value is 0.5 mm. |
| HaloRight | Double | This is set by a client application to define the active halo to the right of text elements. The default value is 0.5 mm. |
| Scheme | Long | This is used to define the adjustment scheme to be used. The meaning of each value is shown in Table 3. |
| SlideInc | Double | This is used to define the incremental distance to be used when applying adjustments along the active slide vector. |
| SlideMaxD | Double | This is used to define the maximum offset from the initial locations that is allowed when applying adjustments along the active slide vector. |
| SlideType | Long | This is used to specify the use of an active slide vector or a curved path as follows:<br>0 = None; 1 = svX; 2 = svY; 3 = svS; 4 = curved path |
| svS(0 to 2) | Double | This is used to specify a supplemental slide vector ie. other than svX and svY. |
| RotationStart | Long | This is used to specify the start angle in degrees when making adjustments by rotation. |
| RotationEnd | Long | This is used to specify the end angle in degrees when making adjustments by rotation. |

TABLE 1-continued

Control Variables

| Control Variable | Type | Description |
|---|---|---|
| RotationInc | Long | This is used to specify the incremental angle in degrees when making adjustments by rotation. |
| Radius | Double | This is used to specify the radius from the origin point to the placement point when making adjustments by rotation. |
| TextSplit | Boolean | This is used to control when long lines of text may be split into a multi-line equivalent. TextSplit is set to TRUE to enable splitting into multi-lines. |
| Npts | Long | This is used to specify the number of points defined in the Ls array and is used to make adjustments along a curve type element. |
| Ls( ) | Double | This is used to define an array of coordinates for a line string and is used to guide adjustments along a curved path. |
| CurveType | Long | This is used to define the curve type that is represented by the Ls array. The following values are applicable:<br>1 = straight line segments to be used<br>2 = Simpson's rule to be applied |

TABLE 2

Status Variables

| Status Variable | Type | Description |
|---|---|---|
| BlockReds | Long | This defines the total number of pixels that clash between the proposed bitmap block and the bitmap of the committed drawing graphics. |
| BlockB | Long | This defines the Breadth in pixels of the representative bitmap for the proposed block currently being checked. |
| BlockD | Long | This defines the Depth in pixels of the representative bitmap for the proposed block currently being checked. |
| BlockArea | Long | This defines the Area in pixels of the representative bitmap for the proposed block currently being checked. |
| WorstLineReds | Long | Several parallel lines are stroked to represent the extent of a text element and this value is the maximum number of pixel clashes on the worst hit. For vector elements, this is equivalent to BlockReds. |
| FullLineRed | Boolean | This is set to TRUE when a complete line of pixels in the proposed graphics element clashes with committed drawing graphics. |

TABLE 3

Adjustment Scheme Options

| Scheme | Type | Description |
|---|---|---|
| 1 | Long | Used to apply uni-directional adjustments to a preferred location point. Adjustments are defined by SlideInc up to a maximum offset defined by SlideMaxD along either a slide vector (svX, svY or svS) or along a curved path specified by the coordinates in the Ls array. The value of SlideInc can be +tive or −tive and the maximum offset distance is based on absolute values. |
| 2 | Long | Used to apply bi-directional alternated adjustments either side of a preferred point. Adjustments are defined by SlideInc up to a maximum offset defined by SlideMaxD along either a slide vector (svX, svY or svS) or along a curved path specified by the coordinates in the Ls array. Only absolute values of SlideInc and SlideMaxD are used with this scheme. |
| 3 | Long | Used to apply a radial adjustment around a rotation point at a distance defined by Radius. The start angle is defined by RotationStart, the incremental rotation angle is defined by RotationInc and the end angle is defined by RotationEnd. The valid range is 0 through 360 degrees. |
| 4 | Long | Used to apply dimension line adjustments relative to the default secondary slide vector (svY). The adjustments are applied alternately to throw the dimension line onto opposite sides of the target dimension point. The initial specified minimum offset is incremented by a value defined by SlideInc up to a maximum defined by SlideMaxD. |

A function is also provided to reset or initialize the 'committed' bitmap and this is invoked when starting a new drawing. This does not have any parameters and is invoked as follows:

ResetWhiteSpace( ).

The method maintains status variables that support adjustments to an initial preferred placement coordinate. Various built-in schemes have been devised based on general requirements and are based on slide vectors, curved paths and rotation angles. A slide vector can be defined in any direction but in general two specific cases have proved effective. The primary slide vector (svX) is defined along the axis of a proposed vector/line or by the character angle of proposed text element. A secondary slide vector (svY) is defined at a 90 degree angle to the primary slide vector.

Thus if svX=(c,s)
then svY=(−s,c)
Where s=sin(Angle) and c=cos(Angle).

Adjustment schemes are applied to monitor White Space status variables and apply appropriate coordinate adjustments along the X and Y slide vectors or along an application defined supplemental vector svS. Within the constraints of an application defined maximum offset, adjustments along a slide vector are repeated until adequate white space is located. A similar scheme has been utilized to affect an adjustment based on a rotation angle about a given fixed point as depicted in FIG. 6. Furthermore, client applications can directly access the status variables reported by the method to apply custom adjustments. The White Space solution paradigm is flexible and should accommodate any conceivable adjustment scheme needed by a client application.

The following pseudo code shows how a client application may utilize the method:

Ws.TrackWhiteSpace=TRUE
Ws.Scheme=2
Ws.SlideType=1
Ws.SlideInc=CharHt
Ws.SlideMaxD=10 * CharHt
Ws.CheckWhiteSpace=TRUE
PlotString(x, y, CardinalPoint, TextString).

With this code example, the preferred placement coordinate (x,y) will be adjusted as required along the implied slide vector svX to ensure the text string is placed in white space. The concept of cardinal point is introduced to provide different placement options for text. These are defined relative to a notional box that encompasses the text elements and can have a value of 1 through 9 as shown in FIG. 5. The (x,y) coordinate in the PlotString function defines the location of the active cardinal point in the drawing plane.

What we claim as our invention is a method for locating white space and the embodiments of our invention for which an exclusive property or privilege is claimed are defined as follows:

1. A method for supporting the automatic creation of computer-based drawings that are virtually free from graphics and text overwrites, comprising:
    a series of drawing plane bitmaps constructed by stroking graphics and text elements into an equivalent pixel set that represents committed drawing graphics and a separate equivalent pixel set that represents proposed drawing graphics;
    the use of said bitmaps to dynamically track the ongoing state of committed drawing graphics;
    the use of said bitmaps to compare proposed drawing graphics with already committed drawing graphics to confirm the availability of white space for the placement of proposed new graphics or to determine the degree of overwriting;
    and based on the availability of white space or the degree of overwriting, control variables and status variables are used to guide adjustments along a vector, or about a rotation point, as a means of moving proposed new graphics into either a location of white space or into a location with less overwriting.

2. The method according to claim 1, wherein bit level manipulations are used to track and compare committed drawing and proposed drawing bitmaps to quantify the quality of white space available in the vicinity of tentative placement coordinates.

3. The method according to claim 1, wherein the said control variables enable client applications to activate and manipulate the behavior of the adjustments.

4. The method according to claim 1, wherein the said status variables quantify the result of tracking and comparison operations and provide client applications with essential information to determine the quality of white space which is quantified by the degree of overwriting.

5. The method according to claim 1, wherein primary, secondary and supplementary slide vectors define the direction along which adjustments are made to move a proposed tentative graphics element into a location of white space or location with less overwriting.

6. The method according to claim 1, wherein a point at a given radius to a given coordinate and a rotation about which adjustments are made to move a proposed tentative graphics element into a location of white space or location with less overwriting.

7. The method according to claim 3, wherein said control variables include halos around graphics elements for controlling the proximity of proposed tentative graphics to committed graphics.

8. The method according to claim 1, wherein the method operates as a server type nucleus that is utilized by client applications that are applied to solve a class of problems where engineering drawings, architectural drawings, maps or other types of diagrams are composed automatically by computer software applications such as, but not limited to, engineering design algorithms, architectural design algorithms and a database of spatial relationships.

9. The method according to claim 3, wherein said control variables allow a skip over feature to be enabled in order to suppress the drawing of a portion of a line over dense areas of committed graphics.

10. The method according to claim 4, wherein said status variables ensure the complete generality of the algorithm and provide information to client applications that are applied to solve a class of problems where engineering drawings, architectural drawings, maps or other types of diagrams are composed automatically by computer software applications such as, but not limited to, engineering design algorithms, architectural design algorithms and a database of spatial relationships.

11. The method according to claim 2, wherein areas of available white space, adequate to position new graphical objects, can be efficiently identified with low level computer instructions, comprising:
    the use of LOGICAL OR and LOGICAL AND operations that make efficient use of computer resources;

and the tracking of areas occupied by previously positioned graphical objects with low level logical OR instructions.

12. The method according to claim 1, wherein text elements are represented in the bitmap as an equivalent filled rectangular block and is used for the purpose of overwrite detection.

13. The method according to claim 1, wherein the method provides performance levels that are linear and proportional to the total number of graphics elements in the completed drawing.

14. The method according to claim 1, wherein white space is located through the use of efficient bitmap manipulations to compare the additional graphics with already committed graphics in a manner that ensures performance levels for comparisons are independent of the complexity and density of the committed graphics.

15. The method according to claim 1, wherein the said bitmaps are also used to represent a 'must hit' filled polygon region that is used to ensure maximum overlap for the proposed graphics, achieved by inverting the objective of the bit level comparisons in favor of an overlay.

16. The method according to claim 12, wherein the said text elements that contain more than a single word, may be split into equivalent multi-line text elements when sufficient white space cannot be located for the initial single line text element.

* * * * *